(12) United States Patent
Whipple

(10) Patent No.: US 9,267,522 B2
(45) Date of Patent: Feb. 23, 2016

(54) LOCKING ASSEMBLY FOR A PANEL BOARD DEVICE

(71) Applicant: EATON CORPORATION, Cleveland, OH (US)

(72) Inventor: Michael Jerome Whipple, Rochester, PA (US)

(73) Assignee: EATON CORPORATION, Cleveland, OH (US)

( * ) Notice: Subject to any disclaimer, the term of this patent is extended or adjusted under 35 U.S.C. 154(b) by 324 days.

(21) Appl. No.: 14/024,664

(22) Filed: Sep. 12, 2013

(65) Prior Publication Data

US 2015/0070860 A1    Mar. 12, 2015

(51) Int. Cl.
| | |
|---|---|
| *H05K 7/14* | (2006.01) |
| *F16B 5/00* | (2006.01) |
| *F16B 5/10* | (2006.01) |
| *H02J 1/00* | (2006.01) |
| *H02B 1/056* | (2006.01) |

(52) U.S. Cl.
CPC ............... *F16B 5/0092* (2013.01); *F16B 5/10* (2013.01); *H02B 1/0565* (2013.01); *H02J 1/00* (2013.01); *Y10T 403/599* (2015.01); *Y10T 403/7007* (2015.01)

(58) Field of Classification Search
CPC ...... H02B 1/056; H02B 1/308; H02B 1/0565; H02B 1/38; H02B 1/042; H02B 1/205; H02B 1/04; H02B 1/052; H02B 1/06; H02B 1/26; H02B 3/00; G01R 11/04; H01H 71/08; H01H 11/00; H01H 1/5822; H01H 1/5855; H01H 2011/0037; H01H 71/1009; H01H 9/02; H01H 9/0264; H01H 9/22; H01H 9/26; H01R 4/36; H01R 9/24; H01R 25/162; H01R 4/2408; H01R 9/2675; H01R 13/18; H01R 9/2458; H01R 9/2491; H02G 3/14; H02G 3/081; H02G 5/025; F16B 5/0092; F16B 5/0635
USPC ......... 361/627, 640, 652, 641, 644, 601, 647, 361/673, 825, 614, 636; 248/222.11; 220/4.02; 335/202; 174/53, 58; 200/293; 218/155; 439/814, 136–138, 439/535, 651; 403/324
See application file for complete search history.

(56) References Cited

U.S. PATENT DOCUMENTS

| | | | | |
|---|---|---|---|---|
| 2,805,294 | A * | 9/1957 | Edmunds | H01H 71/126 200/50.31 |
| 2,930,020 | A * | 3/1960 | Powell | H02B 1/056 174/152 R |
| 4,963,846 | A * | 10/1990 | Grunert | H01H 71/126 335/172 |
| 5,745,337 | A * | 4/1998 | Reiner | H02B 1/056 361/627 |
| 5,875,093 | A * | 2/1999 | White | H02B 1/056 361/637 |

(Continued)

*Primary Examiner* — Hung S Bui
*Assistant Examiner* — Michael Matey
(74) *Attorney, Agent, or Firm* — Eckert Seamans Cherin & Mellott, LLC; David C. Jenkins; Grant E. Coffield

(57) ABSTRACT

A lock pin assembly is provided. The lock pin assembly is structured to coupled a panel board device to a panel board. The panel board device includes a body defining a number of mounting passages. The lock pin assembly includes an elongated body, a first radial extension, and, in an exemplary embodiment, a biasing device. The lock pin body is rotatably disposed in the panel board device mounting passage. The lock pin body is moved between an unlocked, first radial position, wherein said first radial extension does not engage a panel board back plate mounting tab, and a locked, second radial position, wherein said first radial extension engages a panel board back plate mounting tab.

20 Claims, 6 Drawing Sheets

(56) References Cited

U.S. PATENT DOCUMENTS

| | | | | |
|---|---|---|---|---|
| 6,362,952 B1 * | 3/2002 | Schoonover | ........... | H02B 1/056 |
| | | | | 174/166 S |
| 7,401,954 B2 * | 7/2008 | Callahan | ................ | B60K 37/06 |
| | | | | 248/27.1 |
| 7,449,645 B1 * | 11/2008 | Flegel | ...................... | H01R 4/64 |
| | | | | 200/50.32 |
| 7,616,431 B2 * | 11/2009 | Moore | ................... | H02G 5/025 |
| | | | | 174/149 B |
| 7,957,122 B2 * | 6/2011 | Sharp | ...................... | H02B 1/056 |
| | | | | 174/67 |
| 2012/0063064 A1 * | 3/2012 | Maloney | ................ | H02B 1/056 |
| | | | | 361/611 |

* cited by examiner

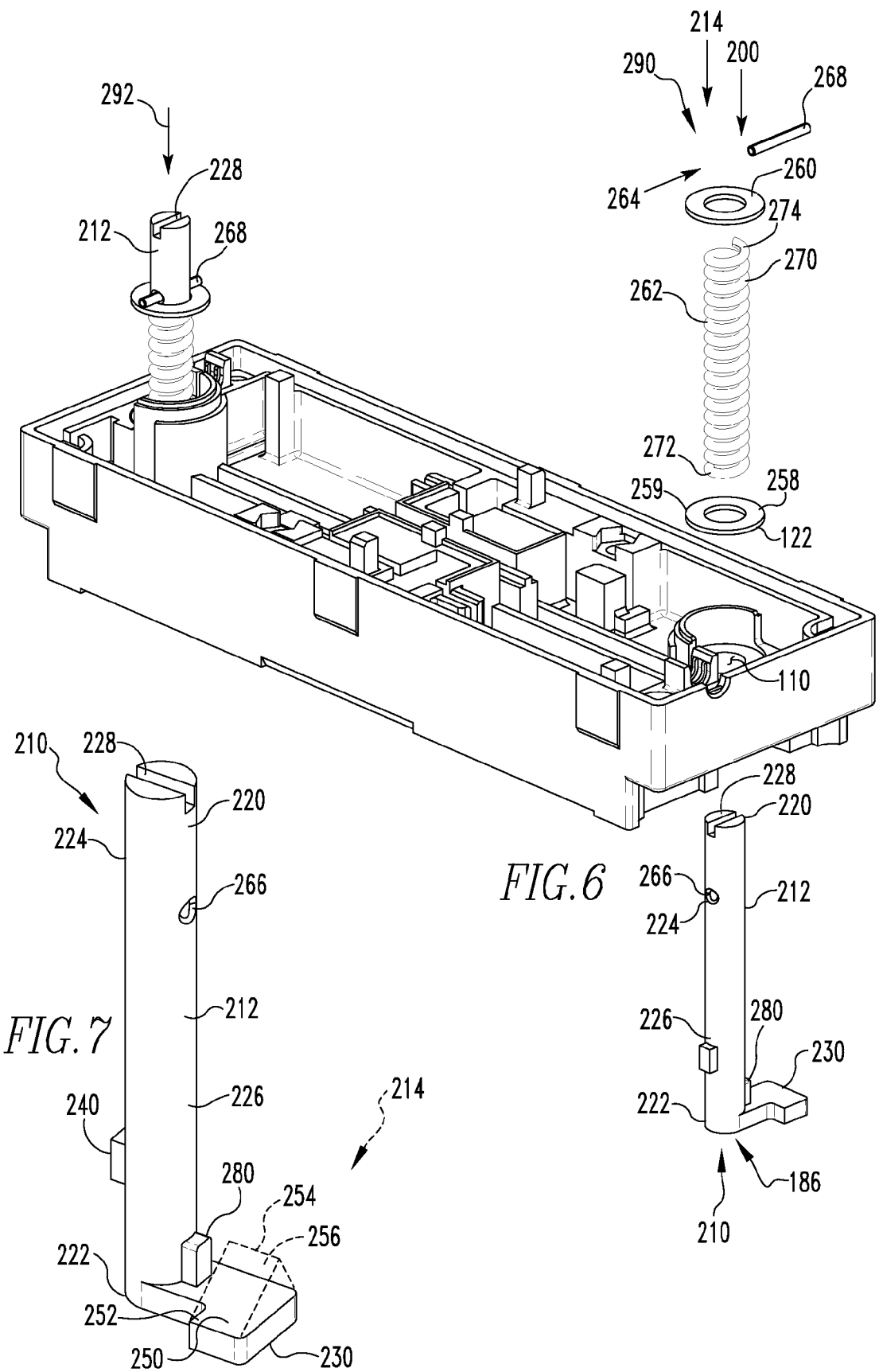

LOCKING ASSEMBLY FOR A PANEL BOARD DEVICE

BACKGROUND OF THE INVENTION

1. Field of the Invention

The disclosed and claimed concept relates to a panel board and, more specifically, to a locking assembly for a panel board device.

2. Background Information

A panel board, or other type of load center, includes a number of conductive members disposed in a housing assembly defining an enclosure. The conductive members include "stabs" to which a panel board device, such as, but not limited to, a circuit breaker, is attached. That is, the conductive members, as shown, are planar members and the stab is a generally planar tab extending generally perpendicular thereto. A panel board device includes a conductive spring clip that engages the stab and thereby couples the panel board device to the conductive member. This is a disadvantage in that a coupling that relies upon friction is not always secure.

Further, the panel board device must include a coupling that is compatible with the size and shape of the stab. This is a disadvantage as not every device that could conveniently be disposed in the panel board housing assembly can be, or needs to be, directly coupled to a stab. That is, a panel board includes other constructs that may be used to mount a panel board device within the housing assembly. For example, in an exemplary embodiment, the panel board housing assembly includes a number of generally opposing mounting tabs to which a panel board device may be coupled.

There is, therefore, a need for a coupling assembly for a panel board that secures, i.e. locks, a panel board device to a panel board or a stab. There is a further need for a locking coupling assembly that is compatible with existing panel boards and their housing assemblies.

SUMMARY OF THE INVENTION

These needs, and others, are met by at least one embodiment of this invention which provides a locking assembly coupled to a panel board device. The panel board device includes a body defining a number of mounting passages and, in an exemplary embodiment, generally circular mounting passages. The locking assembly includes a lock pin assembly. The lock pin assembly includes an elongated body, a first radial extension, and, in an exemplary embodiment, a biasing device. The lock pin body is rotatably disposed in the panel board device mounting passage. The lock pin body is moved between an unlocked, first radial position, wherein said first radial extension does not engage a panel board back plate mounting tab, and a locked, second radial position, wherein said first radial extension engages a panel board back plate mounting tab. In an exemplary embodiment, the biasing device engages the panel board back plate mounting tab thereby coupling the radial extension and the panel board back plate mounting tab in a secure manner, i.e. locking the radial extension and the panel board back plate mounting tab together.

BRIEF DESCRIPTION OF THE DRAWINGS

A full understanding of the invention can be gained from the following description of the preferred embodiments when read in conjunction with the accompanying drawings in which:

FIG. 6 is an isometric view of a an interface assembly with an exploded locking coupling assembly.
FIG. 7 is a detail isometric view of one embodiment of a lock pin.

DESCRIPTION OF THE PREFERRED EMBODIMENTS

Figure 1:
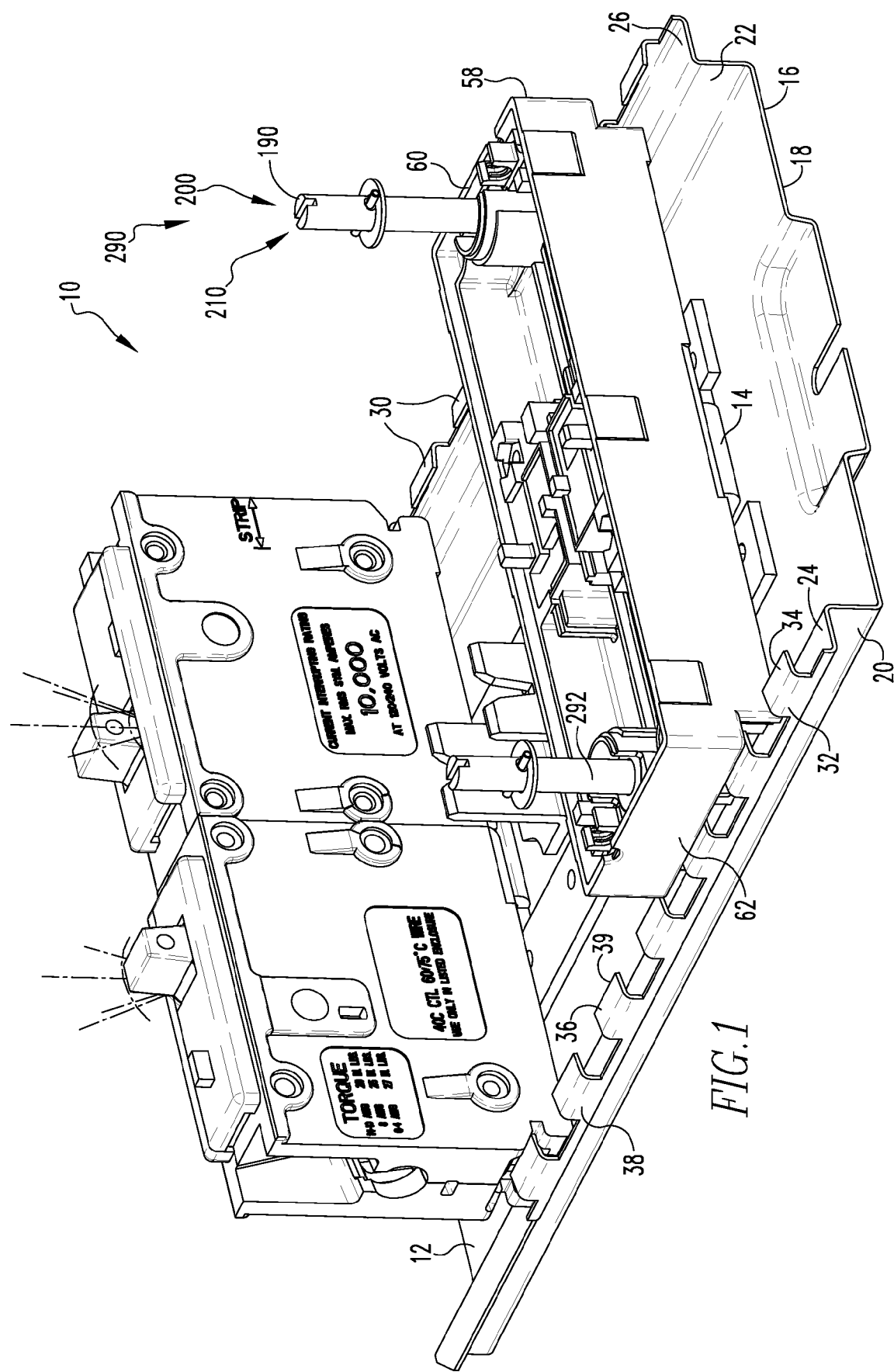
FIG. 1 is a partial isometric view of a panel board.

Directional phrases used herein, such as, for example, clockwise, counterclockwise, left, right, top, bottom, upwards, downwards and derivatives thereof, relate to the orientation of the elements shown in the drawings and are not limiting upon the claims unless expressly recited therein.

As used herein, the singular form of "a," "an," and "the" include plural references unless the context clearly dictates otherwise.

As used herein, the statement that two or more parts or components are "coupled" shall mean that the parts are joined or operate together either directly or indirectly, i.e., through one or more intermediate parts or components, so long as a link occurs. As used herein, "directly coupled" means that two elements are directly in contact with each other. As used herein, "fixedly coupled" or "fixed" means that two components are coupled so as to move as one while maintaining a constant orientation relative to each other. Accordingly, when two elements are coupled, all portions of those elements are coupled. A description, however, of a specific portion of a first element being coupled to a second element, e.g., an axle first end being coupled to a first wheel, means that the specific portion of the first element is disposed closer to the second element than the other portions thereof. Further, an object resting on another object held in place only by gravity is not "coupled" to the lower object unless the upper object is otherwise coupled thereto. That is, for example, a book resting on a table is not coupled thereto, but a book glued to a table is coupled thereto.

As used herein, a "coupling assembly" includes two or more couplings or coupling components. The components of a coupling or coupling assembly are generally not part of the same element or other component. As such, the components of a "coupling assembly" may not be described at the same time in the following description.

As used herein, a "coupling" or "coupling component(s)" is one or more component(s) of a coupling assembly. That is, a coupling assembly includes at least two components that are structured to be coupled together. It is understood that the components of a coupling assembly are compatible with each other. For example, in a coupling assembly, if one coupling component is a snap socket, the other coupling component is a snap plug, or, if one coupling component is a bolt, then the other coupling component is a nut.

As used herein, the statement that two or more parts or components "engage" one another shall mean that the elements exert a force or bias against one another either directly or through one or more intermediate elements or components.

As used herein, "secure" and/or "lock" means that a coupling utilizes two components, one stationary and one movable and wherein the movable component rotates or slides between a first position, wherein the movable component does not engage the stationary component and a second position, wherein the movable component engages the stationary component. It is noted that a lock assembly, such as but not limited to a deadbolt on a door, meets this definition in that the deadbolt only performs the locking function when an attempt is made to open the door and the deadbolt engages the latch plate. It is further noted that a coupling such as a spring clip does not secure" and/or "lock" elements together as it flexes between a first and second position.

As used herein, an "easy release" locking coupling is a coupling wherein the movable component can be decoupled from the stationary component with a minimal motion such as, but not limited to, a rotational motion of about 180 degrees or less. Further, the identified range is the range intended for the movable component. That is, the fact that a bolt may be inserted into a nut by half a turn does not make a bolt and a nut an "easy release" locking coupling and as used herein, a bolt and a nut are specifically excluded from the definition of an "easy release" locking coupling.

As used herein, the word "unitary" means a component is created as a single piece or unit. That is, a component that includes pieces that are created separately and then coupled together as a unit is not a "unitary" component or body.

As used herein, the term "number" shall mean one or an integer greater than one (i.e., a plurality).

As used herein, "associated" means that the elements are part of the same assembly and/or operate together, or, act upon/with each other in some manner. For example, an automobile has four tires and four hub caps. While all the elements are coupled as part of the automobile, it is understood that each hubcap is "associated" with a specific tire.

As used herein, "correspond" indicates that two structural components are sized and shaped to be similar to each other and may be coupled with a minimum amount of friction. Thus, an opening which "corresponds" to a member is sized slightly larger than the member so that the member may pass through the opening with a minimum amount of friction. This definition is modified if the two components are said to fit "snugly" together or "snuggly correspond." In that situation, the difference between the size of the components is even smaller whereby the amount of friction increases. If the element defining the opening and/or the component inserted into the opening are made from a deformable or compressible material, the opening may even be slightly smaller than the component being inserted into the opening. This definition is further modified if the two components are said to "substantially correspond." "Substantially correspond" means that the size of the opening is very close to the size of the element inserted therein; that is, not so close as to cause substantial friction, as with a snug fit, but with more contact and friction than a "corresponding fit," i.e., a "slightly larger" fit. Further, as used herein, "loosely correspond" means that a slot or opening is sized to be larger than an element disposed therein. This means that the increased size of the slot or opening is intentional and is more than a manufacturing tolerance. Further, with regard to a surface formed by two or more elements, a "corresponding" shape means that surface features, e.g. curvature, are similar.

As used herein, "structured to [verb]" means that the identified element or assembly has a structure that is shaped, sized, disposed, coupled and/or configured to perform the identified verb. For example, a member that is "structured to move" is movably coupled to another element and includes elements that cause the member to move or the member is otherwise configured to move in response to other elements or assemblies.

As used herein, "at" means on or near.

Figure 2:
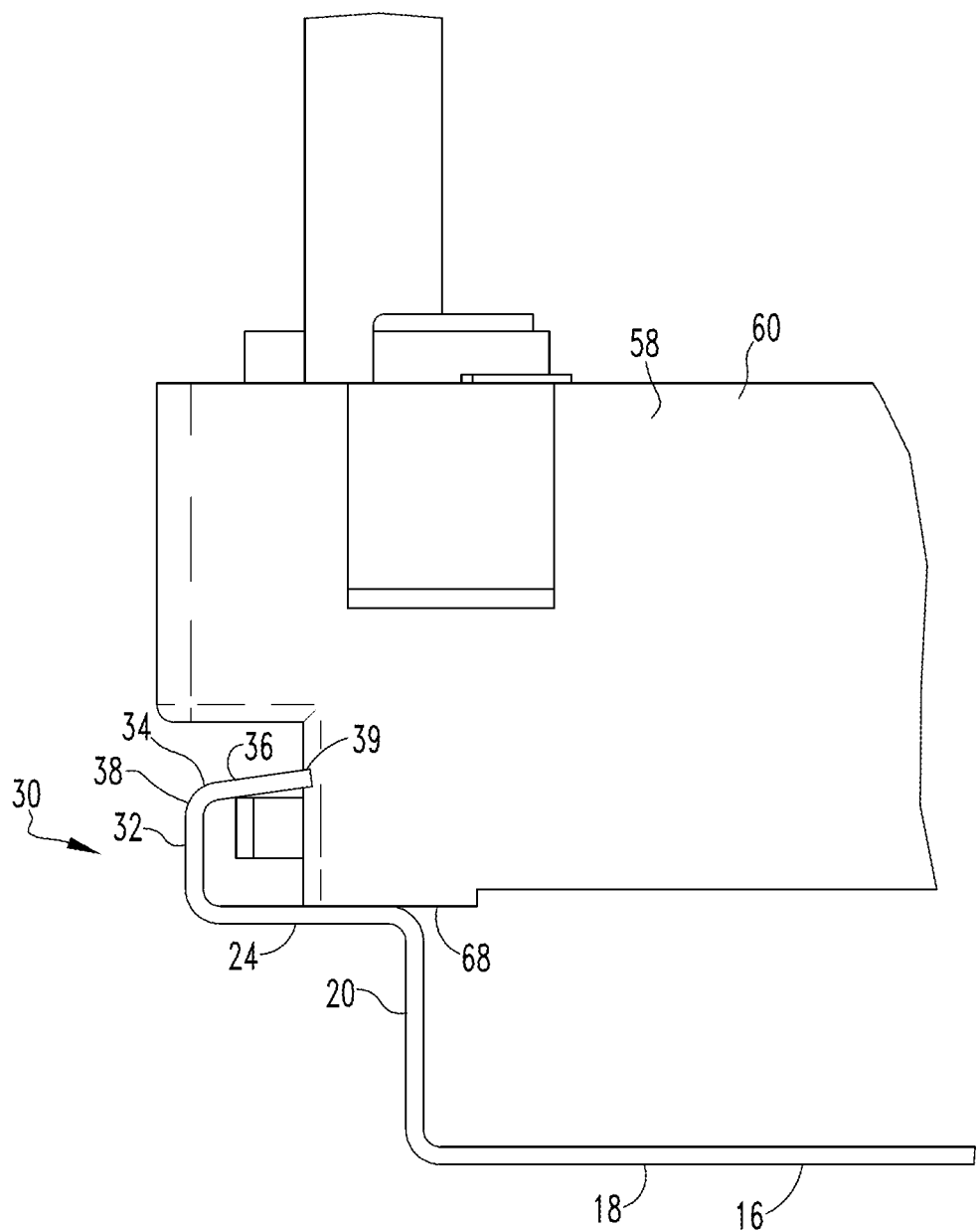
FIG. 2 is s detail end view of a panel board.

As shown in FIGS. 1 and 2, and in an exemplary embodiment, a panel board 10 is an assembly including a housing assembly 12 (shown in part) and a number of conductive members 14. In an exemplary embodiment, the housing assembly 12 is made of metal. As is known, the housing assembly 12 includes a number of sidewalls, including a door (not shown), that define an enclosed space. As shown, the housing assembly 12 includes a back plate 16. The back plate 16 is a generally planar body 18 that further includes generally planar peripheral flanges 20, 22 that extend generally perpendicular to the plane of the back plate body 18. The peripheral flanges 20, 22 in turn include outwardly extending flanges 24, 26 that extend generally perpendicular to the plane of the associated peripheral flanges 20, 22. Each outwardly extending flange 24, 26 includes a number of mounting constructs 30. Each mounting construct 30 includes a spacer member 32 and a mounting tab 34. Each spacer member 32 extends generally perpendicular to the plane of the associated outwardly extending flange 24, 26 and generally parallel to the plane of the associated peripheral flanges 20, 22. Each mounting tab 34 is a generally planar member 36 extending over, and generally perpendicular to the plane of, the associated peripheral flanges 20, 22, and, generally perpendicular to the plane of the spacer member 32 from which it depends. That is, each mounting tab planar member 36 includes a proximal end 38 and a distal end 39. Each tab proximal end 38 is flexibly coupled to the associated spacer member 32, or stated broadly, flexibly coupled to the panel board housing assembly back plate 16. In this configuration, each mounting tab 34 moves between a non-flexed, first position, wherein the mounting tab 34 extends generally parallel to the plane of the panel board housing assembly back plate 16, and a flexed, second position wherein the mounting tab 34 is generally angled relative to the plane of the panel board housing assembly back plate 16. In the second mounting tab 34 position, each mounting tab 34 creates a bias.

Figure 3:
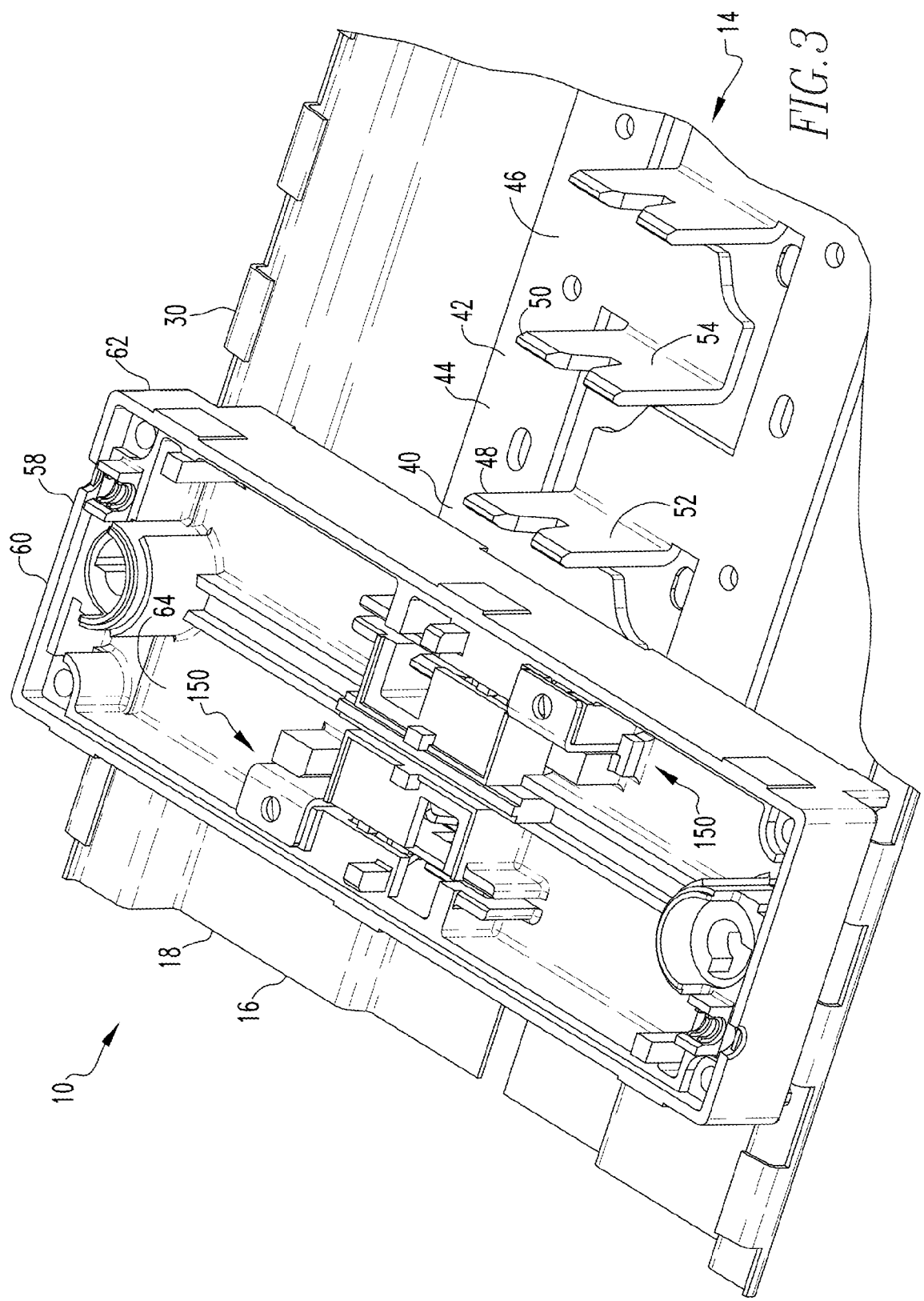
FIG. 3 is a detail isometric view of a panel board.

In an exemplary embodiment, the number of conductive members 14 include a first phase conductor 40 and a second phase conductor 42. As shown in FIG. 3, the first phase conductor 40 and second phase conductor 42 each include a generally planar portion 44, 46 that are disposed in adjacent, generally parallel planes. A non-conductive barrier (not shown) is disposed between the first phase conductor 40 and second phase conductor 42. The first phase conductor 40 and second phase conductor 42 each include a number of stabs 48, 50. Each stab 48, 50 includes a planar body 52, 54, that extends generally perpendicular to the plane of the first phase conductor 40 and second phase conductor 42. In an exemplary embodiment, the first phase conductor planar portion 44 has a serpentine shape, thereby allowing the second phase conductor stabs 50 to extend between gaps in the first phase conductor planar portion 44. Thus, the stabs 48, 50 are generally aligned and spaced from each other.

A panel board device 58 includes, but is not limited to, constructs structured to be coupled to the stabs 48, 50 and/or disposed within the housing assembly 12 such as, but not limited to, a Molded Case SPD (Molded Case Surge Protection Device). As shown in FIGS. 1-3, in an exemplary embodiment, the panel board device 58 is represented by an interface assembly 60. That is, the interface assembly 60 is a panel board device 58. As such, it is understood that any element described in association with an interface assembly 60 is also applicable to a panel board device 58. Thus, it is understood, for example, that interface assembly body 62, described below, is also a "panel board device body" It is further noted, however, that the interface assembly 60 is, as described below, structured to support other components, such as but not limited to, other panel board devices 58 and printed circuit board devices (not shown), whereas a panel board device 58 may have other functions and may not include all of the elements of the interface assembly 60.

Figure 4:
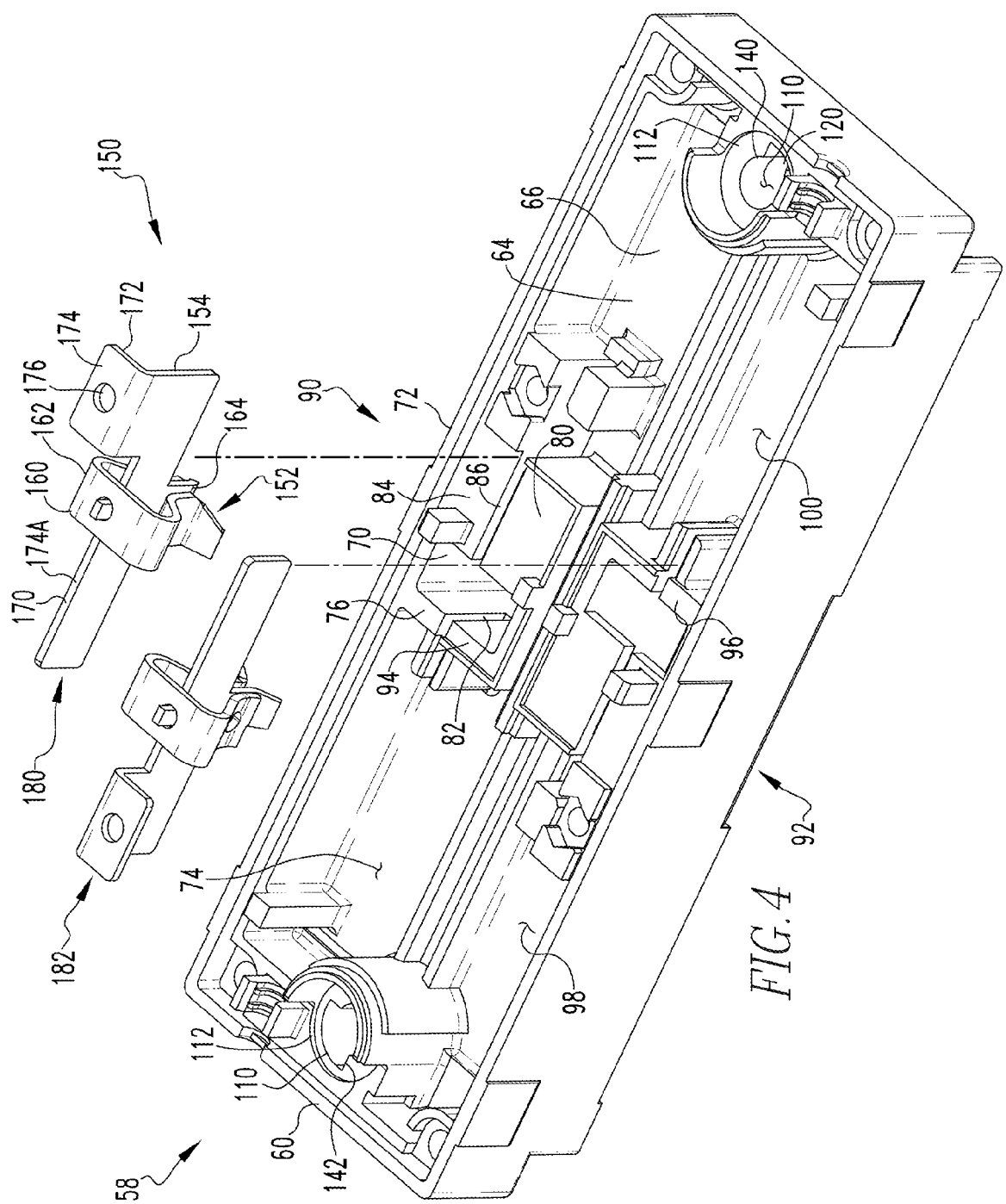
FIG. 4 is an exploded view of an interface assembly and conductor assembly.
Figure 5:
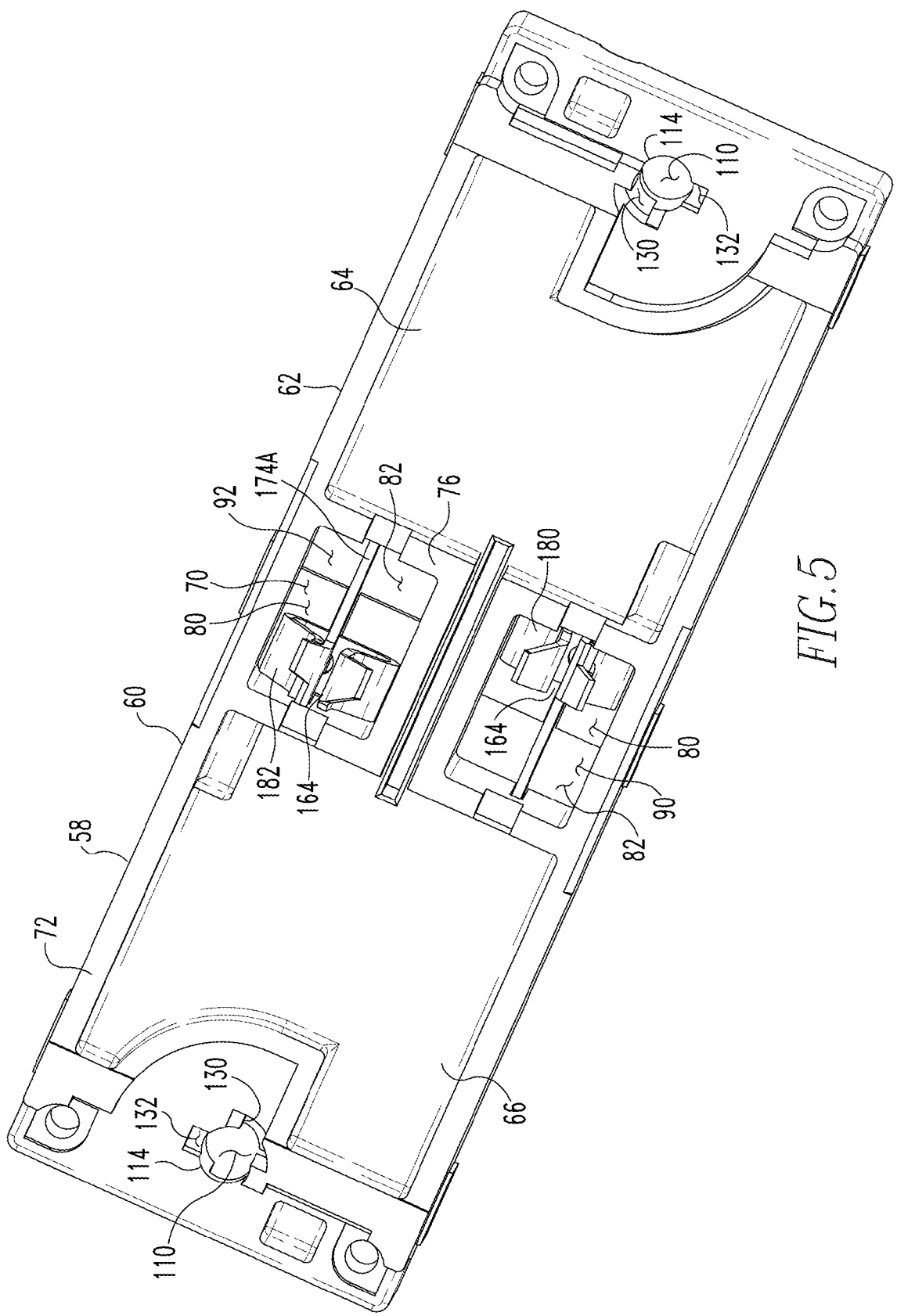
FIG. 5 is a bottom isometric view of an interface assembly.

As shown in FIGS. 3 and 4, in an exemplary embodiment, the interface assembly 60 includes a body 62, number of conductor assemblies 150, and a number of locking member assemblies 190 (FIG. 1). In an exemplary embodiment, the interface assembly body 62 is made from a non-conductive material. In an exemplary embodiment, the interface assembly body 62 includes an elongated, generally planar member 64. The interface assembly body 62 includes a front side 66 and a back side 68 (FIG. 5). The interface assembly body 62 defines a number of passages including a number of conductor passages 70 and a number of mounting passages 110.

In an exemplary embodiment, the interface assembly body 62 is generally rectangular and includes a flange 72 extending about the interface assembly body planar member 64 thereby defining a support compartment 74. A number of components, e.g. printed circuit board devices, can be disposed in the support compartment 74. The interface assembly body 62 further includes a number of collars 76. Each collar 76 extends about a conductor passage 70. The collars 76 are disposed on either, or both, the interface assembly body planar member front side 66 and/or back side 68. Further, each conductor passage 70 includes a first portion 80 and a second portion 82 which, in an exemplary embodiment, are a first lateral portion and a second lateral portion. In an exemplary embodiment, each collar 76 disposed on the interface assembly body planar member front side 66 includes a top member 84 substantially extending over the conductor passage first portion 80. That is, as shown in FIG. 4, a collar 76 and a collar top member 84, in an exemplary embodiment, includes a slot 86 extending across the associated conductor passage 70.

In an exemplary embodiment, the number of conductor passages 70 includes a first conductor passage 90 and a second conductor passage 92. Accordingly, the number of collars 76 includes a first collar 94 and a second collar 96. The first collar 94 is disposed about the first conductor passage 90 and is located on the interface assembly body front side 66. The second collar 96 is disposed about the second conductor passage 92 and is located on the interface assembly body front side 66. In an exemplary embodiment, the first and second conductor passages 90, 92, and therefore the first and second collars 94, 96, are disposed medially on the interface assembly body 62. In this configuration, the first and second collars 94, 96 separate the support compartment 74 into a first lateral support compartment 98 and a second lateral support compartment 100.

In an exemplary embodiment, the interface assembly body 62 is structured to be secured to a panel board housing assembly 12 by the locking member assembly 190. The locking member assemblies 190 are each disposed in a mounting passage 110. Each mounting passage 110, in an exemplary embodiment, is generally circular and extends generally perpendicular to the plane of the interface assembly body planar member 64. Each mounting passage 110 includes an upper first end 112, disposed at the interface assembly body front side 66, and a lower, second end 114, disposed at the interface assembly body back side 68.

As set forth below, the locking member assembly 190 includes features that interact with the interface assembly body 62 and, more specifically, with the mounting passages 110. That is, as discussed below and shown in FIGS. 6 and 7, the locking member assembly 190, and more specifically, a lock pin assembly 210, includes elongated bodies 212 each disposed in a mounting passage 110. Further, the lock pin assembly bodies 212 move axially within a mounting passage 110. Further, the lock pin assembly bodies 212 include a number of radial extensions 230, 240. To accommodate these motions and the lock pin assembly body radial extensions 230, 240, each mounting passage 110 includes a radial cavity 120 (FIG. 4). Each radial cavity 120 is positioned so as to engage a lock pin assembly body radial extension 230, 240 when the lock pin assembly body 212 is in a second radial position and a first axial position, as discussed below. That is, each radial cavity 120 includes an upper surface 122, discussed below, that extends generally perpendicular to the mounting passage 110. The radial cavity upper surface 122 is, in one embodiment (not shown), a unitary part of the interface assembly body 62. In an exemplary embodiment, the radial cavity upper surface 122 is part of a first biasing device mounting 258, discussed below, that is not unitary with the interface assembly body 62.

In an exemplary embodiment, each mounting passage 110 further includes a first locking pocket 130, and a second locking pocket 132, shown in FIG. 5. Both the first and second locking pockets 130, 132 are disposed at the mounting passage second end 114 and are radially spaced from each other. The first and second locking pockets 130, 132 are open at the mounting passage second end 114. That is, the first and second locking pockets 130, 132 can be accessed axially from the mounting passage second end 114.

In an exemplary embodiment, there are two mounting passages 110, a first mounting passage 140 and a second mounting passage 142. In an exemplary embodiment, each of the first and second mounting passages 140, 142 is disposed at the longitudinal axis of the interface assembly body planar member 64. Further, each of the first and second mounting passages 140, 142 is disposed at the lateral side of the interface assembly body planar member 64. In another exemplary embodiment, not shown, there are four mounting passages 110, each disposed at a corner of the interface assembly body planar member 64.

As shown in FIG. 4, each conductor assembly 150 includes a stab coupling assembly 152 and a secondary coupling assembly 154. The stab coupling assembly 152 and the secondary coupling assembly 154 are each made from a conductive material. Each stab coupling assembly 152 is structured to be coupled to, and be in electrical communication with, one of the stabs 48, 50. Each secondary coupling assembly 154 is structured to be coupled to, and be in electrical communication with another panel board device (not shown). Further, the stab coupling assembly 152 and the secondary coupling assembly 154 in a conductor assembly 150 are coupled, directly coupled or fixed to each other and are in electrical communication.

Each stab coupling assembly 152 is disposed in a conductor passage 70. In an exemplary embodiment, each stab coupling assembly 152 is a spring clip 160. As used herein, a "spring clip" is a construct including a number of movable members wherein a movable member is biased against another movable member or a stationary member; in an exemplary embodiment, the movable members are flexibly coupled to each other or a stationary member. Thus, the members move between a number of positions including a closed, first position, wherein the members contact each other or are disposed relatively close to each other, and an open, second position; in the second position, wherein the members are spaced from each other a greater distance than when in the first position and wherein the movable members are biased against any element disposed between the members. As shown in FIG. 4 an exemplary spring clip 160 includes a body 162 shaped as a generally planar triangular loop, i.e. a hollow triangle, wherein the sides of the spring clip body 162 are not joined at one corner 164.

The secondary coupling assembly 154, in an exemplary embodiment, includes a generally planar, elongated body 170 with a generally perpendicular extension 172. The secondary coupling assembly perpendicular extension 172 is a terminal 174. As used herein, a "terminal" is a portion of a conductive member that is structured to be coupled to another conductive member. That is, a portion of a conductive member that can be coupled, i.e. is merely capable of being coupled, to another conductive member, is not a "terminal." The secondary coupling assembly perpendicular extension 172 includes a tapped passage 176. The secondary coupling assembly body 170, in an exemplary embodiment, is coupled to, directly coupled to, or fixed to a spring clip body 162 and extends generally perpendicular to the plane of the spring clip body 162.

As shown in FIG. 4, each conductor assembly 150 is disposed in a conductor passage 70 with the stab coupling assembly 152, i.e. the spring clip body 162 disposed in conductor passage first portion 80. Further, the secondary coupling assembly 154, i.e. the planar, elongated body 170, is disposed on the interface assembly body front side 66. In this configuration, the stab coupling assembly 152 is structured to engage, i.e. be coupled to and in electrical communication with, a stab 48, 50 with the stab 48, 50 entering the conductor passage 70 from the interface assembly body back side 68. Further, each secondary coupling assembly 154, and more specifically, each secondary coupling assembly perpendicular extension 172 is disposed in the support compartment 74. Further, in this configuration, the portion of the secondary coupling assembly 154 disposed in the conductor passage second portion 82 can also be used as a terminal 174A. That is, a coupling such as but not limited to a spring clip 160, can be coupled to the terminal 174A.

It is noted that, during assembly, the conductor assembly 150 can be positioned on the interface assembly body planar member front side 66 with the stab coupling assembly 152, i.e. the spring clip body 162, aligned with the conductor passage second portion 82. The stab coupling assembly 152, i.e. the spring clip body 162, is moved into the conductor passage second portion 82 with the secondary coupling assembly 154, i.e. the planar, elongated body 170, passing through, or disposed in, the slot 86. The conductor assembly 150 can then be moved until the stab coupling assembly 152, i.e. the spring clip body 162, is disposed in conductor passage first portion 80.

Further, as noted above, in an exemplary embodiment, there is a first conductor passage 90 and a second conductor passage 92. Accordingly, in an exemplary embodiment, there is a first conductor assembly 180 and a second conductor assembly 182. The first conductor assembly 180 is disposed in the first conductor passage 90 and the second conductor assembly 182 is disposed in the second conductor passage 92. Further, as noted above, in this configuration, the support compartment 74 is divided into a first lateral support compartment 98 and a second lateral support compartment 100. In an exemplary embodiment, the first conductor assembly 180 is oriented so that the first conductor assembly secondary coupling assembly perpendicular extension 172 (hereinafter, "first conductor assembly perpendicular extension") is disposed in the first lateral support compartment 98. Further, the second conductor assembly 182 is oriented so that the second conductor assembly secondary coupling assembly perpendicular extension 172 (hereinafter, "second conductor assembly perpendicular extension") is disposed in the second lateral support compartment 100.

Further, in an exemplary embodiment, the spacing of the first conductor passage 90 and the second conductor passage 92 correspond to the spacing of the tabs 48, 50. In this configuration, the first conductor assembly 180 is disposed in the first conductor passage 90 and is structured to engage the stab 48 from the first phase conductor 40. That is, the stab 48 is disposed in the stab coupling assembly 152, i.e. the spring clip body 162, and is thereby coupled to and in electrical communication therewith. Further, the second conductor assembly 182 is disposed in the second conductor passage 92 and is structured to engage the stab 50 from the second phase conductor 42. That is, the stab 50 is disposed in the stab coupling assembly 152, i.e. the spring clip body 162, and is thereby coupled to and in electrical communication therewith.

The interface assembly 60, or another embodiment of a panel board device 58, is coupled to, and in an exemplary embodiment secured to, the panel board housing assembly 12, and more specifically the back plate 16, by a number of locking member assemblies 190, as shown in FIG. 1. Each locking member assembly 190 is an element of a locking coupling assembly 200. Each locking coupling assembly 200 includes the mounting tabs 34 and mounting passages 110 noted above, as well as the locking member assembly 190. In an exemplary embodiment, the number of locking member assemblies 190 include a number of lock pin assemblies 210.

As shown in FIG. 6, a lock pin assembly 210 includes a body 212 (hereinafter "lock pin body") and a biasing assembly 214. As shown in FIG. 7, the lock pin body 212 includes a first end 220 and a second end 222. Between the lock pin body first end and second end 220, 222 there is a first medial portion 224 and a second medial portion 226. That is, as described below, the lock pin body 212 moves between an upper, first axial position and a lower, second axial position. When the lock pin body 212 is in the upper, first axial position, the portion of the lock pin body 212 above the panel board device body 62 is the first medial portion 224. Further, when the lock pin body 212 is in the upper, first axial position, the portion of the lock pin body 212 within the mounting passage 110 and below the panel board device body 62 is the second medial portion 226. A tool coupling 228, such as but not limited to a slot for a screwdriver, is disposed at the lock pin body first end 220. A first radial extension 230 is disposed at the lock pin body second end 222.

In an exemplary embodiment, the lock pin assembly body 212 is generally cylindrical and the diameter corresponds to a mounting passage 110. Thus, the lock pin assembly body 212 can be, and is, rotatably disposed in a mounting passage 110. That is, the lock pin assembly body 212 is rotatably coupled to the panel board device body 62. As noted above, each of the first and second mounting passages 140, 142 is disposed at the lateral side of the interface assembly body planar member 64. In this configuration, the first radial extension 230 is disposed adjacent to the mounting tabs 34. In this configuration, the lock pin body 212 is structured to be moved between an unlocked, first radial position, wherein the first radial extension 230 does not engage a panel board back plate mounting tab 34, and a locked, second radial position, wherein the first radial extension 230 engages a panel board back plate mounting tab 34. Further, the amount that the lock pin body 212 needs to be rotated is between about 70 degrees and 180 degrees, or in an exemplary embodiment about 90 degrees. Thus, the lock pin body 212 is an easy release locking coupling 186.

The first radial extension 230 is disposed at the interface assembly body back side 68, and thereby prevents the lock pin body 212 from moving upwardly in the associated mounting passage 110. In an exemplary embodiment, a second radial extension 240 also engages the interface assembly body 62.

That is, the second radial extension 240 is disposed on the lock pin body second medial portion 226 and is structured to engage the radial cavity 120 in the associated mounting passage 110 when the lock pin body 212 is in the second radial position.

In an exemplary embodiment, shown in ghost in FIG. 7, the biasing assembly 214 is a cam that engages a mounting tab 34. That is, in this embodiment, the panel board device body back side 68 is structured to, and does, contact the back plate outwardly extending flanges 24, 26, as shown in FIG. 2. Thus, the panel board device body 62 cannot move toward the back plate outwardly extending flanges 24, 26. Further, in this embodiment, the lock pin body 212 does not move axially in the associated mounting passage 110. That is, for example, the radial cavity 120 has an axial dimension generally corresponding to the axial dimension of the second radial extension 240. In this configuration, the lock pin body 212 does not move axially in the associated mounting passage 110. Further, the first radial extension 230 includes an upper surface 250. The first radial extension upper surface 250 is angled relative to the plane of rotation of the first radial extension 230. That is, the first radial extension 230 has a narrow end 252 and a wide end 254. In this configuration, the first radial extension upper surface 250 is a cam surface 256. The first radial extension 230 is disposed adjacent a mounting tab 34 so that, when the lock pin body 212 is in the unlocked, first radial position, the first radial extension narrow end 252 is adjacent the mounting tab 34. As the lock pin body 212 moves toward and into the second radial position, the cam surface 256 engages the mounting tab 34 causing the mounting tab 34 to flex. That is, flexing of the mounting tab 34 creates a bias acting on the lock pin body 212.

In another exemplary embodiment, shown in FIG. 6, the biasing assembly 214 includes a first biasing device mounting 258, a second biasing device mounting 260 and a biasing device 262. In an exemplary embodiment, the first biasing device mounting 258 is a washer 259 disposed about each mounting passage 110. The washer 259 provides a planar surface that is engaged by the biasing device 262 as well as providing a cover for the radial cavity 120 discussed above. Thus, the first biasing device mounting 258 is also, as used herein, a part of the panel board device body 62. In an exemplary embodiment, the second biasing device mounting 260 is a projection assembly 264. The projection assembly 264 includes a passage 266 through the lock pin body first medial portion 224 and a pin 268 extending therethrough. The projection assembly pin 268 is longer than the diameter of the lock pin body 212. Thus, when the projection assembly pin 268 is disposed in the projection assembly passage 266, the projection assembly pin 268 extends therefrom thereby creating a projection.

In an exemplary embodiment, the biasing device 262 is a compression spring 270. The biasing device 262 includes a first end 272 and a second end 274. The compression spring 270 extends between the first biasing device mounting 258 and the second biasing device mounting 260. In this configuration, the biasing device 262, and therefore the biasing assembly 214, biases the lock pin body 212 to the upper, first axial position. In an exemplary embodiment, the biasing device first end 272 is coupled to the first biasing device mounting 258, and, the biasing device second end 274 is coupled to the second biasing device mounting 260.

In this exemplary embodiment, the lock pin body 212 further includes a locking lug 280, shown in FIG. 7. The locking lug 280, in an exemplary embodiment, is disposed axially inwardly from the first radial extension 230. That is, the locking lug 280 extends axially from the first radial extension upper surface 250. The locking lug 280 corresponds to the first and second locking pockets 130, 132. In this configuration, when the lock pin body 212 is in the first radial position and the first axial position, the locking lug 280 is disposed in the first locking pocket 130. Further, when the lock pin body 212 is in the second radial position and the first axial position, the locking lug 280 is disposed in the second locking pocket 132. Further, when the lock pin body 212 is in the second axial position, the locking lug 280 is not disposed in either the first or second locking pocket 130, 132. Thus, the lock pin body 212 cannot be substantially rotated when the lock pin body 212 is in the first axial position. That is, interference, i.e. contact, between the locking lug 280 and the surfaces defining the first and second locking pocket 130, 132 prevents rotation of the lock pin body 212.

As noted above, in an exemplary embodiment there are two mounting passages 110, a first mounting passage 140 and a second mounting passage 142. In an exemplary embodiment, each of the first and second mounting passages 140, 142 is disposed at the longitudinal axis of the interface assembly body planar member 64. In this embodiment, the number of lock pin assemblies 210 includes a first lock pin assembly 290 and a second lock pin assembly 292. The first lock pin assembly 290 is rotatably disposed in the first mounting passage 140, and, the second lock pin assembly 292 is rotatably disposed in the second mounting passage 142.

A lock pin assembly 210 of this configuration is utilized as follows. If a panel board device 58, e.g. interface assembly 60, is not attached to a panel board 10, and if the lock pin body 212 is in the first radial position and first axial position, a user positions the panel board device 58 between the opposing mounting tabs 34 on the panel board back plate 16 with the first and second mounting passages 140, 142, and therefor each locking member assembly 190, aligned with a mounting tab 34. The user then applies bias to a lock pin body first end 220, thereby overcoming the bias of the biasing assembly 214 and moving the lock pin body 212 to the second axial position. The user then rotates the lock pin body 212 to the second radial position and releases the pressure on the lock pin body first end 220. The biasing assembly 214 then moves the lock pin body 212 to the second axial position. When the biasing assembly 214 moves the lock pin body 212 to the second axial position, bias is applied between the first radial extension 230 and a panel board back plate mounting tab 34. Thus, the lock pin body 212 is in the second radial position. A lock pin assembly 210 of a configuration utilizing a cam surface 256 operates in a similar manner except there is no need to move the lock pin body 212 axially and the counter bias of the mounting tab 34 creates the engagement between the mounting tab 34 and the first radial extension 230.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of invention which is to be given the full breadth of the claims appended and any and all equivalents thereof.

What is claimed is:

1. A locking member for a panel board device structured to be mounted in a panel board, said panel board including a housing assembly, said panel board housing assembly including a back plate, said back plate including number of generally opposed, inwardly extending mounting tabs, said panel board device including a body, said panel board device body defining a number of mounting passages, each mounting passage including an upper first end and a lower, second end, said locking member comprising:
- a lock pin assembly including an elongated body with a first end and a second end;
- a first radial extension disposed at said lock pin body second end;
- said lock pin body structured to be rotatably disposed in said panel board device mounting passage;
- said lock pin body structured to be moved between an unlocked, first radial position, wherein said first radial extension does not engage a panel board back plate mounting tab, and a locked, second radial position, wherein said first radial extension engages a panel board back plate mounting tab; and
- wherein said lock pin body is an easy release locking coupling.

2. The locking member of claim 1 wherein said panel board device body includes a radial cavity, and wherein:
- said lock pin body includes a first medial portion and a second medial portion;
- said lock pin body includes a second radial extension disposed on said lock pin body second medial portion; and
- wherein said second radial extension is structured to engage said radial cavity when said lock pin body is in said second radial position.

3. The locking member of claim 1 wherein said panel board device body includes a first biasing device mounting disposed about said mounting passage and wherein:
- said lock pin assembly includes a biasing assembly;
- said biasing assembly including a second biasing device mounting and a biasing device;
- said biasing device including a first end and a second end;
- said biasing device first end coupled to said first biasing device mounting;
- said biasing device second end coupled to said second biasing device mounting; and
- wherein said lock pin body is structured to be moved between an upper, first axial position and a lower, second axial position.

4. The locking member of claim 3 wherein said panel board device body mounting passage includes a first locking pocket disposed at said mounting passage second end and a second locking pocket disposed at said mounting passage second end, wherein said first and second locking pockets are radially spaced from each other, and wherein:
- said lock pin body includes a radially extending locking lug, said locking lug corresponding to said first and second locking pockets;
- wherein, when said lock pin body is in said first radial position and said first axial position, said locking lug is disposed in said first locking pocket;
- wherein, when said lock pin body is in said second radial position and said first axial position, said locking lug is disposed in said second locking pocket; and
- wherein when said lock pin body is in said second axial position, said locking lug is not disposed in either said first or second locking pocket.

5. The locking member of claim 3 wherein:
- said biasing assembly biasing device is a compression spring; and
- said second biasing device mounting includes a projection assembly disposed about said body at said body first medial portion.

6. The locking member of claim 1 wherein each said mounting tab is a generally planar member including a proximal end and a distal end, each said tab proximal end flexibly coupled to said panel board housing assembly back plate, wherein each said tab moves between a non-flexed, first position and a flexed, second position, and wherein:
- said first radial extension includes an upper surface;
- a cam surface disposed on said first radial extension upper surface; and
- wherein, when said lock pin body is in said unlocked, first radial position, said cam surface does not engage said mounting tab, and, when said lock pin body is in said locked, second radial position, said cam surface engages said mounting tab and moves said tab into said flexed, second position.

7. A panel board device structured to be mounted in a panel board, said panel board including a housing assembly, said panel board housing assembly including a back plate, said panel board back plate including generally opposed, inwardly extending mounting tabs, said panel board device comprising:
- a body, said panel board device body defining a number of mounting passages;
- each mounting passage including an upper first end and a lower, second end;
- a number of a lock pin assemblies each including an elongated body with a first end and a second end;
- a first radial extension disposed at each lock pin body second end;
- each said lock pin body rotatably disposed in an associated panel board device body mounting passage;
- each said lock pin body movable between an unlocked, first radial position, wherein said first radial extension does not engage a panel board back plate mounting tab, and a locked, second radial position, wherein said first radial extension engages a panel board back plate mounting tab; and
- wherein said lock pin body is an easy release locking coupling.

8. The panel board device of claim 7 wherein:
- each said panel board device body mounting passage includes a radial cavity;
- each said lock pin body includes a first medial portion and a second medial portion;
- each said lock pin body includes a second radial extension disposed on said lock pin body second medial portion; and
- wherein each said second radial extension is structured to engage an associated radial cavity when each said lock pin body is in said second radial position.

9. The panel board device of claim 7 wherein:
- said panel board device body includes a first biasing device mounting disposed about said mounting passage;
- each said lock pin assembly includes a biasing assembly;
- each said biasing assembly includes a second biasing device mounting and a biasing device;
- each said biasing device includes a first end and a second end;
- wherein each said biasing device first end is coupled to said first biasing device mounting;
- wherein said biasing device second end is coupled to said second biasing device mounting; and
- wherein said lock pin body moves between an upper, first axial position and a lower, second axial position.

10. The panel board device of claim 9 wherein:
- each said panel board device body mounting passage includes a first locking pocket disposed at said mounting passage second end and a second locking pocket disposed at said mounting passage second end;
- wherein said first and second locking pockets are radially spaced from each other;

each said lock pin body includes a radially extending locking lug, said locking lug corresponding to said first and second locking pockets;

wherein, when each said lock pin body is in said first radial position and said first axial position, each said locking lug is disposed in an associated first locking pocket;

wherein, when each said lock pin body is in said second radial position and said first axial position, said locking lug is disposed in an associated second locking pocket; and wherein when each said lock pin body is in said second axial position, each said locking lug is not disposed in either associated said first or second locking pocket.

11. The panel board device of claim 9 wherein:

each said biasing assembly biasing device is a compression spring; and each said second biasing device mounting includes a projection assembly disposed about said lock pin body at said lock pin body first medial portion.

12. The panel board device of claim 7 wherein:

said panel board device body is elongated;

said panel board device body includes a first mounting passage and a second mounting passage;

said number of lock pins includes a first lock pin assembly and a second lock pin assembly;

said first lock pin assembly rotatably disposed in said panel board device body first mounting passage; and said second lock pin assembly rotatably disposed in said panel board device body second mounting passage.

13. The panel board device of claim 7 wherein each said mounting tab is a generally planar member including a proximal end and a distal end, each said tab proximal end flexibly coupled to said panel board housing assembly back plate, wherein each said tab moves between a non-flexed, first position and a flexed, second position, and wherein:

said first radial extension includes an upper surface;

a cam surface disposed on said first radial extension upper surface;

wherein, when said lock pin body is in said unlocked, first radial position, said cam surface does not engage said mounting tab, and, when said lock pin body is in said locked, second radial position, said cam surface engages said mounting tab and moves said tab into said flexed, second position.

14. A panel board comprising:

a housing assembly including a back plate, said panel board back plate including generally opposed, inwardly extending mounting tabs, each said mounting tab is a generally planar member including a proximal end and a distal end, each said tab proximal end flexibly coupled to said panel board housing assembly back plate, wherein each said mounting tab moves between a non-flexed, first position and a flexed, second position;

panel board device including a body and a number of a lock pin assemblies;

said panel board device body defining a number of mounting passages;

each mounting passage including an upper first end and a lower, second end;

each lock pin assembly including an elongated body with a first end and a second end;

a first radial extension disposed at each lock pin body second end;

each said lock pin body rotatably disposed in an associated panel board device body mounting passage;

each said lock pin body movable between an unlocked, first radial position, wherein said first radial extension does not engage a panel board back plate mounting tab, and a locked, second radial position, wherein said first radial extension engages a panel board back plate mounting tab; and wherein said lock pin body is an easy release locking coupling.

15. The panel board of claim 14 wherein:

each said panel board device body mounting passage includes a radial cavity;

each said lock pin body includes a first medial portion and a second medial portion;

each said lock pin body includes a second radial extension disposed on said lock pin body second medial portion; and wherein each said second radial extension is structured to engage an associated radial cavity when each said lock pin body is in said second radial position.

16. The panel board of claim 14 wherein:

said panel board device body includes a biasing device mounting disposed about said mounting passage;

each said lock pin assembly includes a biasing assembly;

each said biasing assembly includes a biasing device mounting and a biasing device;

each said biasing device includes a first end and a second end;

wherein each said biasing device first end is coupled to said first biasing device mounting;

wherein said biasing device second end is coupled to said second biasing device mounting; and wherein said lock pin body moves between an upper, first axial position and a lower, second axial position.

17. The panel board of claim 16 wherein:

each said panel board device body mounting passage includes a first locking pocket disposed at said mounting passage second end and a second locking pocket disposed at said mounting passage second end;

wherein said first and second locking pockets are radially spaced from each other;

each said lock pin body includes a radially extending locking lug, said locking lug corresponding to said first and second locking pockets;

wherein, when each said lock pin body is in said first radial position and said first axial position, each said locking lug is disposed in an associated first locking pocket;

wherein, when each said lock pin body is in said second radial position and said first axial position, said locking lug is disposed in an associated second locking pocket; and wherein when each said lock pin body is in said second axial position, each said locking lug is not disposed in either associated said first or second locking pocket.

18. The panel board of claim 16 wherein:

each said biasing assembly biasing device is a compression spring; and each said second biasing device mounting includes a projection assembly disposed at said lock pin body first medial portion.

19. The panel board of claim 14 wherein:

said panel board device body is elongated;

said panel board device body includes a first mounting passage and a second mounting passage;

said number of lock pins includes a first lock pin assembly and a second lock pin assembly;

said first lock pin assembly rotatably disposed in said panel board device body first mounting passage; and said second lock pin assembly rotatably disposed in said panel board device body second mounting passage.

20. The panel board of claim 14 wherein each said mounting tab is a generally planar member including a proximal end and a distal end, each said tab proximal end flexibly coupled to said panel board housing assembly back plate, wherein each said tab moves between a non-flexed, first position and a flexed, second position, and wherein:
- said first radial extension includes an upper surface;
- a cam surface disposed on said first radial extension upper surface; and
- wherein, when said lock pin body is in said unlocked, first radial position, said cam surface does not engage said mounting tab, and, when said lock pin body is in said locked, second radial position, said cam surface engages said mounting tab and moves said tab into said flexed, second position.

* * * * *